US006744772B1

(12) United States Patent
Eneboe et al.

(10) Patent No.: US 6,744,772 B1
(45) Date of Patent: Jun. 1, 2004

(54) CONVERTING ASYNCHRONOUS PACKETS INTO ISOCHRONOUS PACKETS FOR TRANSMISSION THROUGH A MULTI-DIMENSIONAL SWITCHED FABRIC NETWORK

(75) Inventors: Michael K. Eneboe, San Jose, CA (US); Andrew D. Hospodor, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 778 days.

(21) Appl. No.: 09/728,634

(22) Filed: Nov. 30, 2000

(51) Int. Cl.$^7$ .............................................. H04L 12/56
(52) U.S. Cl. ...................... 370/400; 370/466; 370/351; 370/230; 370/474
(58) Field of Search ................................ 370/351, 400, 370/230, 466, 474, 392, 398, 468, 412, 395.4

(56) References Cited

U.S. PATENT DOCUMENTS

| | | | | |
|---|---|---|---|---|
| 5,444,700 A | * | 8/1995 | Martikainen et al. | 370/351 |
| 5,581,703 A | | 12/1996 | Baugher et al. | |
| 6,317,415 B1 | * | 11/2001 | Darnell et al. | 370/230 |
| 6,590,903 B1 | * | 7/2003 | Hofers et al. | 370/466 |
| 6,611,892 B1 | * | 8/2003 | Sasaki et al. | 710/306 |
| 6,697,914 B1 | * | 2/2004 | Hospodor et al. | 711/112 |

OTHER PUBLICATIONS

Alistair Croll and Eric Packman, "Managing Bandwidth—Deploying QOS in Enterprise Networks", Prentice Hall, Upper Saddle River, NJ, pp. 14–15, 217–305, 1999.
Jose Duato, Sudhakar Yalamanchili, Lionel Ni, "Interconnection Networks An Engineering Approach", IEEE Computer Society Press, pp. 35–106, 1997, ISBN 0–8186–7800–3.

InfiniBand Architecture Release 0.9, vol. 1—General Specifications, pp. 47–51; Mar. 31, 2000.
D. D. Kandlur, K. G. Shin, D. Ferrari, "Real–Time Communication in Multihop Networks", IEEE Transactions on Parallel and Distributed Systems, vol. 5, No. 10, pp. 1044–1056, Oct. 1994.
W.C. Lee, M.G. Hluchi, and P.A. Humblet, "Routing Subject to Quality of Service Contraints in Integrated Communication Networks", IEEE Network, pp. 46–55, Jul./Aug. 1995.
J. Rexford, J. Hall, K. G. Shin, "A Router Architecture for Real–Time Communication in Multicomputer Networks", IEEE Transactions on Computers, vol. 47, No. 10, pp. 1088–1101, Oct. 1998.
J. Rexford, J. Dolter and K. G. Shin, "Hardware Support for Controlled Interaction of Guaranteed and Best–Effort Communication", Proceedings of the Workshop on Parallel and Distributed Real–Time Systems, pp. 188–193, Apr. 1994.
D.D. Kandlur and K.G. Shin, "Traffic Routing for Multi–Computer Networks with Virtual Cut–Through Capability", Proc. 10th Int. Conf. Distributed Computing Systems, 1990, pp. 398–405.

* cited by examiner

Primary Examiner—Chau Nguyen
Assistant Examiner—Nittaya Juntima
(74) Attorney, Agent, or Firm—Milad G. Shara, Esq.; Howard H. Sheerin, Esq.

(57) ABSTRACT

A switched node for use in a multi-dimensional switched fabric network is disclosed. The switched node comprises adapter circuitry connected to receive asynchronous and isochronous packets from an external entity. Each asynchronous packet comprises destination node routing information and data, and each isochronous packet comprises a path ID corresponding to a reserved path through the network, an arrival time parameter identifying a target arrival time of the isochronous packet into the switched node, and data. An asynchronous-to-isochronous converter converts the asynchronous packets into isochronous packets comprising the data from the asynchronous packets.

19 Claims, 4 Drawing Sheets

CONVERTING ASYNCHRONOUS PACKETS INTO ISOCHRONOUS PACKETS FOR TRANSMISSION THROUGH A MULTI-DIMENSIONAL SWITCHED FABRIC NETWORK

CROSS REFERENCE TO RELATED APPLICATIONS AND PATENTS

This application is related to co-pending patent application Ser. No. 09/675,850 entitled "DISTRIBUTED RESOURCE RESERVATION SYSTEM FOR ESTABLISHING A PATH THROUGH A MULTI-DIMENSIONAL COMPUTER NETWORK TO SUPPORT ISOCHRONOUS DATA" filed on Sep. 28, 2000, the disclosure of which is incorporated herein by reference.

BACKGROUND OF THE INVENTION

1. Field of the Invention

The present invention relates to computer networks. More particularly, the present invention converts asynchronous packets into isochronous packets for transmission through a multi-dimensional switched fabric network.

2. Description of the Prior Art

Data transmitted through a computer network includes asynchronous or "best-effort" data and isochronous or "time-constrained" data. Asynchronous data is injected into the network at arbitrary intervals and forwarded to a destination node within an unconstrained (best-effort) time interval. An example of asynchronous data is transaction data transmitted between an end user and a service provider (e.g., a web site). Isochronous data, in contrast, is typically injected into the network at a periodic interval and forwarded to a destination node within a predetermined time-constrained interval. An example of isochronous data is a video stream which must be transmitted to an end user at a guaranteed periodic interval to facilitate uninterrupted viewing.

Details of a prior art method for transmitting best-effort and time-constrained data through a multi-dimensional switched fabric network are disclosed by Jennifer Rexford, et al. in "A Router Architecture for Real-Time Communication in Multicomputer Networks", *IEEE Transactions on Computers*, Vol. 47, No. 10, October 1998, which is incorporated herein by reference. Rexford suggests to implement a switched node using a data structure (a queue or virtual cache) for best-effort data and a separate data structure (another queue or virtual cache) for time-constrained data. Rexford also suggests to prioritize virtual lanes so that on-time time-constrained data is transmitted through the switch ahead of any pending best-effort data. However, the additional hardware support needed to handle best-effort data using a separate data structure increases the complexity and cost of the switch. In addition, giving absolute priority to time-constrained data can degrade the performance of the network with respect to best-effort data, which may be undesirable. Further, it is not possible to control the variance in transmitting best-effort data if it is always transmitted subordinate to time-constrained data. Best-effort data may also subject the network to deadlock, a condition where a packet cannot advance toward the destination node because the buffers (or other resources) in the path cannot be allocated to transmit the packet.

There is, therefore, a need to improve performance of a multi-dimensional switched fabric network for both isochronous (time-constrained) as well as asynchronous (best-effort) data. In particular, there is a need to simplify the circuitry within each switched node, to mitigate blocking of asynchronous data by isochronous data, to control transmission variance, and to mitigate deadlock.

SUMMARY OF THE INVENTION

The present invention may be regarded as a switched node for use in a multi-dimensional switched fabric network. The switched node comprises adapter circuitry connected to receive asynchronous and isochronous packets from an external entity. Each asynchronous packet comprises destination node routing information and data, and each isochronous packet comprises a path ID corresponding to a reserved path through the network, an arrival time parameter identifying a target arrival time of the isochronous packet into the switched node, and data. An asynchronous-to-isochronous converter converts the asynchronous packets into isochronous packets comprising the data from the asynchronous packets. A plurality of bi-directional ports receive isochronous packets from other switched nodes and transmit isochronous packets to other switched nodes. A data buffer stores the isochronous packets received from the bi-directional ports, the isochronous packets received from the adapter circuitry, and the isochronous packets comprising the asynchronous data. Routing circuitry selects at least one of the bi-directional ports to output the stored isochronous packets, and assigns a departure time parameter to each of the stored isochronous packets. A scheduler, responsive to the target arrival times and the departure times, schedules the transmission of the stored isochronous packets through at least one of the bi-directional ports In one embodiment, the asynchronous-to-isochronous converter comprises a microprocessor for reserving a path through the network for transmitting the isochronous packets comprising the data from the asynchronous packets. In one embodiment, the path is reserved by routing a request packet through the switched fabric between the source and destination nodes, wherein resources are reserved along the path of the request packet. In another embodiment, the microprocessor schedules the transmission of the isochronous packets comprising the data from the asynchronous packets. In yet another embodiment, the switched node further comprises an isochronous-to-asynchronous converter for converting isochronous packets comprising asynchronous data into asynchronous packets for transmission by the adapter circuitry to the external entity.

The present invention may also be regarded as a multi-dimensional switched fabric network comprising a plurality of interconnected switched nodes. A select number of the switched nodes comprise adapter circuitry connected to receive asynchronous and isochronous packets from an external entity. Each asynchronous packet comprises destination node routing information and data. Each isochronous packet comprises a path ID corresponding to a reserved path through the network, an arrival time parameter identifying a target arrival time of the isochronous packet into the switched node, and data. An asynchrbnous-to-isochronous converter within the switched nodes converts the asynchronous packets into isochronous packets comprising the data from the asynchronous packets. The switched nodes comprise a plurality of bi-directional ports for receiving isochronous packets from other switched nodes and for transmitting isochronous packets to other switched nodes. A data buffer within the switched nodes stores the isochronous packets received from the bi-directional ports, the isochronous packets received from the adapter circuitry, and the isochronous packets comprising the asynchronous data.

Routing circuitry within the switched nodes selects at least one of the bi-directional ports to output the stored isochronous packets, and stores a departure time parameter for each of the stored isochronous packets. A scheduler within the switched nodes, responsive to the target arrival times and the departure times, schedules the transmission of the stored isochronous packets through at least one of the bi-directional ports.

The present invention may also be regarded as a multi-dimensional switched fabric network comprising a plurality of interconnected switched nodes and an input for receiving asynchronous and isochronous packets from host initiators. Each asynchronous packet comprises destination node routing information and data. Each isochronous packet comprises a path ID corresponding to a reserved path through the network, an arrival time parameter identifying a target arrival time of the isochronous packet into each switched node, and data. A central microprocessor converts the received asynchronous packets into isochronous packets comprising the data from the asynchronous packets. Each switched node comprises a plurality of bi-directional ports for transmitting the received isochronous packets and the isochronous packets comprising the data from the asynchronous packets through the network. A data buffer stores the received isochronous packets and the isochronous packets comprising the data from the asynchronous packets. Routing circuitry selects at least one of the bi-directional ports to output the stored isochronous packets. The routing circuitry also stores a departure time parameter for each of the stored isochronous packets. A scheduler schedules, responsive to the target arrival times and the departure times, schedules the transmission of the stored isochronous packets through at least one of the bi-directional ports.

In one embodiment, the central microprocessor reserves a path through the network for transmitting the isochronous packets comprising the data from the asynchronous packets. In one embodiment, the path is reserved by routing a request packet through the switched fabric between the source and destination nodes, wherein resources are reserved along the path of the request packet. In another embodiment, the central microprocessor schedules the transmission of the isochronous packets comprising the data from the asynchronous packets. In yet another embodiment, the central microprocessor converts isochronous packets comprising asynchronous data received from the switched nodes into asynchronous packets transmitted to the host initiators.

The present invention may also be regarded as a method of transmitting asynchronous and isochronous packets through a multi-dimensional switched fabric network comprising a plurality of switched nodes. An asynchronous packet is injected into the switched fabric network, wherein the asynchronous packet comprises destination routing information. An isochronous packet is also injected in to the switched fabric network, wherein the isochronous packet comprises a path ID corresponding to a reserved path through the network, and a target arrival time parameter identifying a target arrival time of the isochronous packet into a selected one of the switched nodes. The asynchronous packet is converted into an isochronous packet comprising the data from the asynchronous packet, and the injected isochronous packet and the isochronous packet comprising the data from the asynchronous packet are stored in a data buffer. Departure time and routing information is stored within each switched storage node corresponding to the injected isochronous packet and the isochronous packet comprising the data from the asynchronous packet. The transmission of the stored isochronous packets through the switched nodes is scheduled based on the target arrival times and the departure times.

In one embodiment, the method further comprises the step of reserving a path through the switched fabric network for the isochronous packet comprising the data from the asynchronous packet. In another embodiment, the method further comprises the step of converting the isochronous packet comprising the data from the asynchronous into an asynchronous packet.

DESCRIPTION OF THE PREFERRED EMBODIMENTS

Figure 3A:
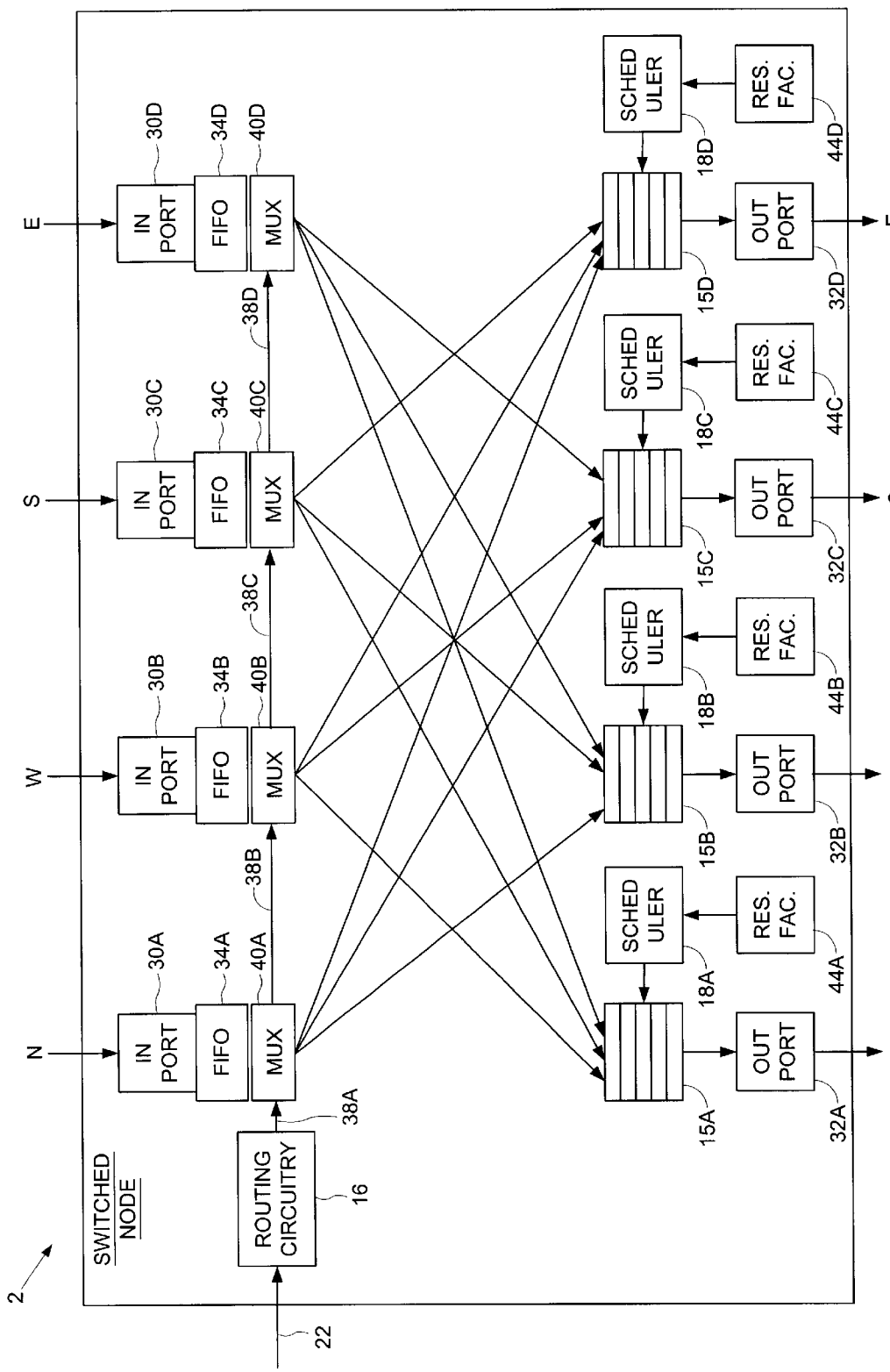
FIG. 3A shows details of a suitable switched node for use in the switched fabric network of FIG. 1.
Figure 3B:
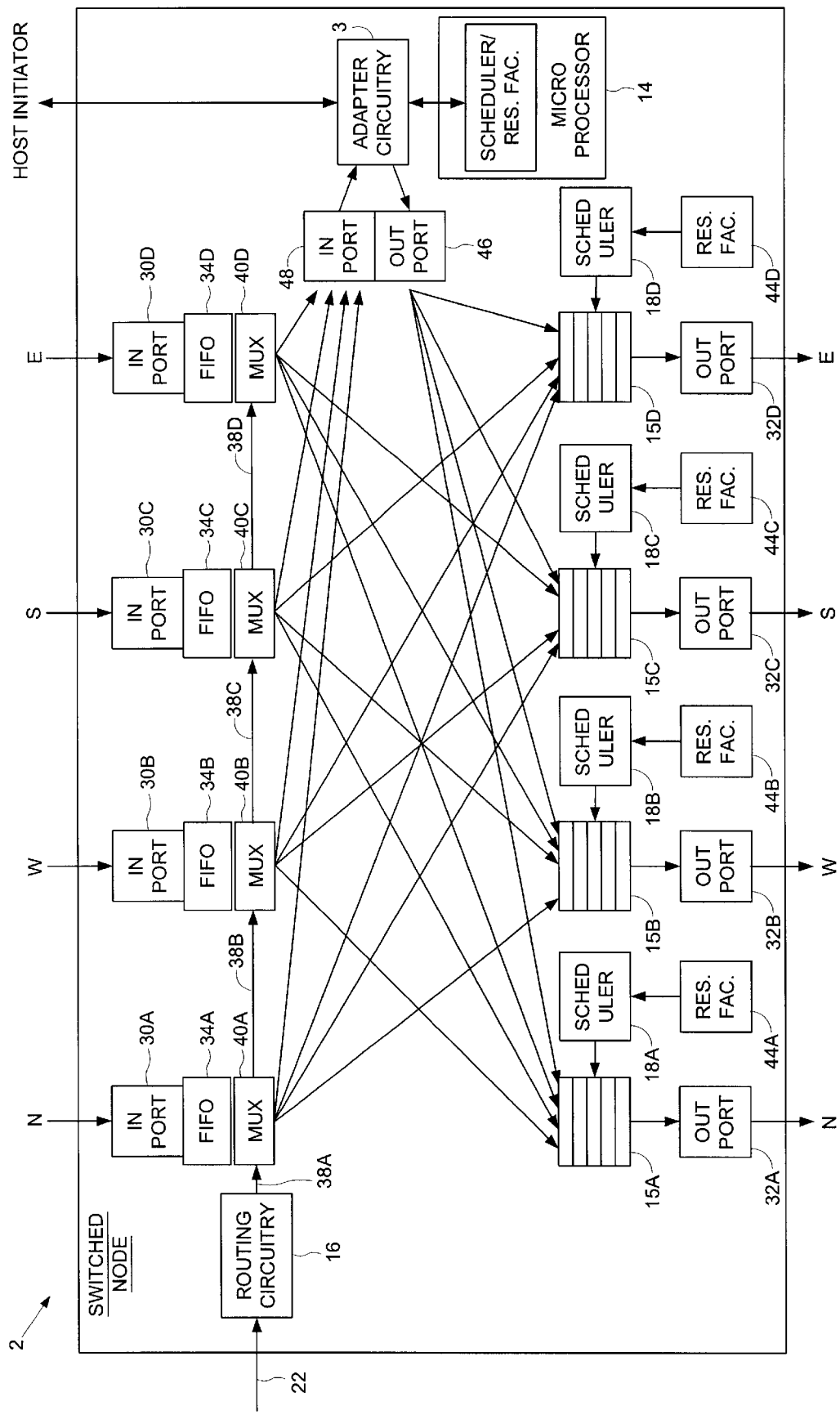
FIG. 3B shows a switched node according to an embodiment of the present invention as comprising adapter circuitry for connecting to an external entity at the edge of the switched fabric network, and an asynchronous-to-isochronous converter for converting asynchronous packets to isochronous packets and for converting isochronous packets back to asynchronous packets.
Figure 4:
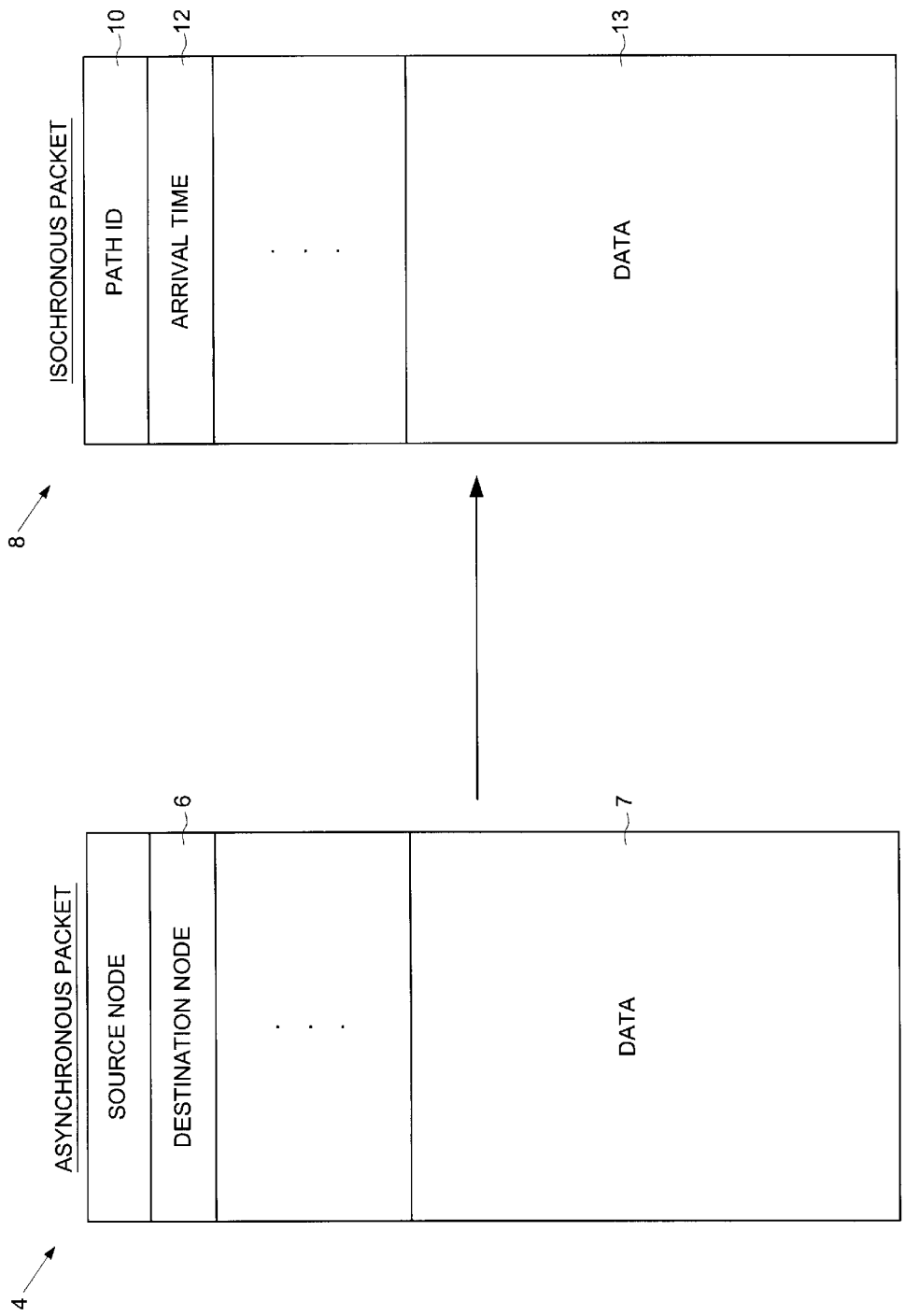
FIG. 4 shows an example format of an asynchronous packet and the resulting format after being converted into an isochronous packet.

FIG. 3B shows a switched node 2 for use in a multi-dimensional switched fabric network according to an embodiment of the present invention. The switched node 2 comprises adapter circuitry 3 connected to receive asynchronous and isochronous packets from an external entity. As shown in FIG. 4, each asynchronous packet 4 comprises destination node routing information 6 and data 7, and each isochronous packet 8 comprises a path ID 10 corresponding to a reserved path through the network, an arrival time parameter 12 identifying a target arrival time of the isochronous packet into the switched node, and data 13. An asynchronous-to-isochronous converter 14 converts the asynchronous packets 4 into isochronous packets 8 comprising the data 7 from the asynchronous packets 4. A plurality of bi-directional ports receive isochronous packets from other switched nodes and transmit isochronous packets to other switched nodes. Data buffers 15A–15D in FIG. 3B store the isochronous packets received from the bi-directional ports, the isochronous packets received from the adapter circuitry 3, and the isochronous packets comprising the asynchronous data 7. Routing circuitry 16 selects at least one of the bi-directional ports to output the stored isochronous packets, and stores a departure time parameter for each of the stored isochronous packets. A scheduler 18A–18D, responsive to the target arrival times and the departure times, schedules the transmission of the stored isochronous packets through at least one of the bi-directional ports.

Figures 1, 2:
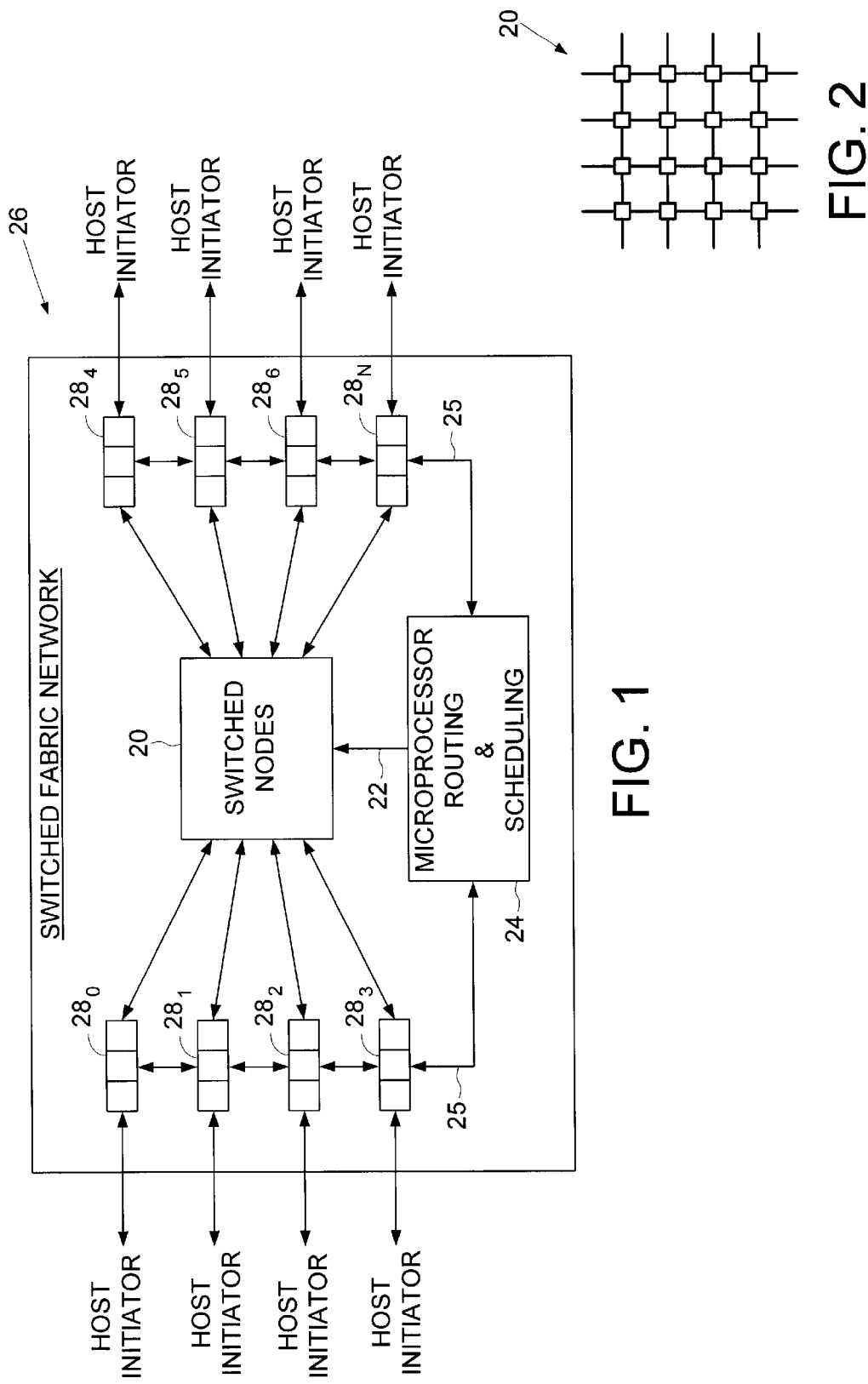
FIG. 1 shows switched fabric network according to an embodiment of the present invention comprising a plurality of switched nodes and a microprocessor implementing a routing and scheduling algorithm and, in one embodiment, for converting asynchronous packets to isochronous packets.
FIG. 2 shows an example topology for the switched nodes of FIG. 1 as a two dimensional switched fabric.

The switched node 2 of FIG. 3B is interconnected with a plurality of other switched nodes 20 such as shown in FIG. 2 to form a multi-dimensional switched fabric. Each of the switched nodes in FIG. 2 comprises four bi-directional ports (North, East, South and West) forming a two-dimensional fabric. In the embodiment of FIG. 1, control data 22 is generated by a switched fabric microprocessor, such as the microprocessor 24 in the switched fabric network 26 shown in FIG. 1, to configure the switched nodes 20 with routing and scheduling information. In another embodiment, the control data 22 is generated by the switched nodes 20 to implement a distributed routing and scheduling algorithm.

In one embodiment, the network data transmitted through the switched nodes 20 consist of packets having a packet header comprising routing data which identifies the destination node for the packet. In the embodiment of FIG. 1, the packets are buffered in buffers $28_0$–$28_N$, and the microprocessor 24 processes the packet header in order to route the packet through the switched nodes 20. A suitable routing algorithm implemented by the microprocessor 24 of FIG. 1 generates control data 22 for configuring the switched nodes 20. Any suitable routing algorithm may be employed, and it may support Unicast, Multicast, or Broadcast delivery mechanisms. The routing decisions may be made centrally, at the source, distributed, or multiphase, implemented using a lookup table or using a finite-state machine. Further, the routing algorithm may be deterministic or adaptive. A discussion of various routing algorithms which may be employed in the embodiments of the present invention is provided by Jose Duato et al. in the text book "Interconnection Networks, an Engineering Approach", IEEE Computer Society, 1997.

The routing algorithm is implemented a layer "above" the switching layer, and thus the routing algorithm may be compatible with various different switching algorithms, for example, Virtual Cut-Through Switching, Wormhole Switching, and Mad Postman Switching. In addition, topologies other than the two-dimensional switched fabric of FIG. 2, as well as topologies comprising more than two dimensions, may be employed in the present invention by decreasing or increasing the number of bi-directional ports per switched node. Various topologies and switching algorithms which may be employed in the embodiments of the present invention are discussed in the aforementioned text book by Jose Duato et al.

In the embodiment shown in FIG. 2, the switched nodes 20 constituting the switched fabric suitably comprise processing circuitry and memory to facilitate the routing, scheduling and resource reservation operations. In one embodiment, a select number of the switched nodes also comprise adapter circuitry for interfacing with an external entity (e.g., a host initiator in FIG. 1) at the "edge" of the fabric. In addition, the switched nodes 20 may or may not comprise a disk and a head for implementing non-volatile storage at the node. In another embodiment, a selected number of the switched nodes comprise a microprocessor for implementing a distributed routing algorithm.

Referring again to FIG. 3B, the bi-directional ports of the switched node 2 comprise four input ports 30A–30D and four output ports 32A–32D corresponding to the North, East, South and West ports shown in FIG. 2. Data packets received from the input ports 30A–30D are buffered in FIFO buffers 34A–34D. The routing circuitry 16 is configured by the control data 22 which, in one embodiment, is generated by the microprocessor 24 of FIG. 1. In another embodiment, the routing operation is distributed such that the control data 22 is generated by other nodes in the network. The routing circuitry 16 generates control signals 38A–38D which configure multiplexers 40A–40D in order to route the data packets to appropriate data buffers 15A–15D associated with the output ports 32A–32D. In this manner, the data packets cross the switched node 2 immediately except for the delay of the FIFO buffer 34A–34D. The FIFO buffers 34A–34D provide buffering of input data in the event that the target data buffer 15 is full or busy receiving data from another of the input ports.

The scheduler 18A–18D within the switched node 2 schedules the time when the data packets are to be transferred from the data buffers 15A–15D to the output ports 32A–32D. In one embodiment, the timing information for the packets is stored in the packet headers and processed by the scheduler 18A–18D together with deadline information stored in the routing circuitry 16. Referring again to FIG. 4, an isochronous packet 8 comprises a path ID 10 for identifying a path reserved through the switched nodes 20 of FIG. 2, and an arrival time parameter 12 identifying a target arrival time into each of the switched nodes 20. The routing circuitry 16 is programmed via the control data 22 to route the isochronous packets to the appropriate output ports 32A–32D corresponding to the reserved path. The routing circuitry 16 of FIG. 3B is also programmed via the control data 22 with deadline information specifying the minimum delay from the time an isochronous packet arrives at the input port 30A–30D to the time it should be forwarded to the next node via the output port 32A–32D in order to support the guaranteed delivery time to the destination node. Before an isochronous packet is forwarded to the next node, the arrival time 12 13 is incremented by the deadline time of the current node. The isochronous packet may actually arrive early at the next node, in which case it is buffered in one or more of the data buffers 15A–15D. The scheduler 18A–18D will not transfer isochronous packets with an early arrival time. Instead, the scheduler 18A–18D will wait until the current time exceeds the arrival time before queuing an isochronous packet for transmission to the next node.

In one embodiment, the data buffers 15A–15D comprise a plurality of virtual lanes where each virtual lane is assigned a predetermined priority level. The scheduler 18A–18D schedules the data packets according to the timing information by queuing the data packets in the appropriate virtual lanes. For example, data packets with shorter transmission deadlines are queued in higher priority virtual lanes, whereas data packets with longer transmission deadlines are queued in lower priority virtual lanes.

The switched node 2 of FIG. 3B can be extended to add dimensionality by duplicating the circuitry associated with each bi-directional port (input port 30, FIFO 34, MUX 40, output port 32, etc.). In one embodiment, the switched node 2 is a commodity device which comprises a facility for dynamically configuring the bi-directional ports to support a desired switched fabric topology. Thus, a number of the input ports 30A–30D and/or a number of the output ports 32A–32D may be configured to connect to ports of other switched nodes, whereas the remaining ports may be left unconnected.

In the embodiment of FIG. 3B, the asynchronous-to-isochronous converter 14 comprises a microprocessor for reserving a path through the switched nodes 20 by reserving resources at each switched node, and for scheduling the transmission of an isochronous packet comprising data from an asynchronous packet. A reservation facility 44A–44D is provided within each of the switched nodes for reserving the resources to support the transmission of the isochronous packet. The resource reservation facility 44A–44D may, for example, reserve a virtual lane within a data buffer 15A–15D to transmit the isochronous packet. In one embodiment, the asynchronous-to-isochronous converter 14 sends control packets asynchronously to other switched nodes in the network to facilitate reserving resources in the path. The asynchronous control packets are transmitted across the switched nodes during "dead times" when isochronous data is not being transmitted. Once the path has been established, a corresponding path ID 10 is assigned to the isochronous packet. In yet another embodiment, the isochronous packet 8 is transmitted concurrent with reserving the path through the switched nodes 20, and the path is "torn down" as the isochronous packet 8 traverses the network. Implementation details for a suitable method of reserving resources in a path through the switched nodes 20 are disclosed in the above referenced patent application entitled "DISTRIBUTED RESOURCE RESERVATION SYSTEM FOR ESTABLISHING A PATH THROUGH A MULTI-DIMENSIONAL COMPUTER NETWORK TO SUPPORT ISOCHRONOUS DATA."

The routing circuitry 16 at each switched node along the reserved path is programmed with the path ID and a deadline parameter specifying the maximum delay tolerable before the isochronous packet should be forwarded to the next switched node. The asynchronous-to-isochronous converter 14 also assigns an initial arrival time 12 to the isochronous packet 8 which may depend on the availability of the reserved path. Thus, the isochronous packet 8 may be delayed initially until the reserved path has been established and is ready to begin the transmission.

In another embodiment, the microprocessor within the asynchronous-to-isochronous converter 14 schedules the transmission of the isochronous packet based on the activity of the switched node 2. When the switched node 2 is ready to transmit the isochronous packet, the isochronous packet is transmitted from an output port 46 associated with the adapter circuitry 3 to at least one of the data buffers 15A–15D where it is scheduled by scheduler 18A–18D for transmission to other switched nodes via the output ports 32A–32D.

In one embodiment, the switched fabric network 26 comprises a suitable timing facility for establishing a time base with which to reserve bandwidth and schedule the transmission of the isochronous packets through the switched nodes 20. The time base may be established using any suitable technique. In one embodiment, a "cycle start" packet is periodically transmitted throughout the network (e.g., at a 8 kHz interval) to establish a time base similar to the IEEE 1394 protocol. Each of the switched nodes 20 are effectively synchronized to the "cycle start" packet and bandwidth is reserved with respect to the "cycle start" packet. In another embodiment, the isochronous data packets are transmitted in fixed-sized "frames" (e.g., 810 bytes every 125 microseconds) so that the frame itself establishes the time base similar to the Sonet/ATM protocol.

In one embodiment, the asynchronous-to-isochronous converter 14 within the switched node 2 combines a number of sequential asynchronous packets having the same destination information 6 into an isochronous stream comprising a plurality of isochronous data packets. A path is reserved through the switched nodes 20 for transmitting the stream, and the path is torn down once the stream has been transmitted. In another embodiment, a single large asynchronous packet is converted into a number of smaller isochronous packets and transmitted through the network as an isochronous stream.

In another embodiment, the switched node 2 of FIG. 3B further comprises an isochronous-to-asynchronous converter for converting isochronous packets comprising asynchronous data into asynchronous packets for transmission by the adapter circuitry 3 to the external entity. The isochronous packets received from the input ports 30A–30D destined for the switched node 2 are routed via multiplexers 40A–40B to an input port 48 associated with the adapter circuitry 3. In one embodiment, the microprocessor 14 performs the isochronous-to-asynchronous conversion.

In another embodiment, the asynchronous-to-isochronous and isochronous-to-asynchronous conversion is performed by a central microprocessor, such as the microprocessor 24 of FIG. 1. When an asynchronous packet 4 is received from a host initiator into buffers $28_0$–$28_N$, it is transmitted via line 25 to the microprocessor 24 which converts the asynchronous packet 4 into an isochronous packet 8, reserves resources in a path through the switched nodes 20, and programs the routing circuitry 16 within each switch node with a path ID, routing information, and a deadline parameter. The microprocessor 24 then inserts the isochronous 12 packet into the appropriate buffer $28_i$ via line 25 for routing through the switched nodes 20. FIG. 3A shows a suitable switched node 42 for use in this embodiment which is essentially the same as FIG. 3B without the asynchronous-to-isochronous converter 14. When the isochronous packet is received by the destination switched node, the central microprocessor 24 converts the isochronous packet back into an asynchronous packet for transmission to the host initiator.

Converting asynchronous packets into isochronous packets simplifies the circuitry within if the switched nodes 20 by eliminating the data structures and processing needed to support asynchronous packets. In addition, the asynchronous packets are not blocked by isochronous packets. Instead, all data transmitted through the network is guaranteed to arrive at the destination node within a known interval. This allows tight control over the variance in transmitting all data over the network, thereby facilitating features such as dynamic Quality-of-Service (QOS) constraints. Moreover, reserving resources through a path before transmitting asynchronous packets as isochronous packets mitigates deadlock by ensuring that resources are available for advancing the packets toward the destination node.

We claim:

1. A switched node for use in a multi-dimensional switched fabric network, the switched node comprising:
   (a) adapter circuitry connected to receive asynchronous and isochronous packets from an external entity, wherein:
      each asynchronous packet comprises destination node routing information and data; and
      each isochronous packet comprises a path ID corresponding to a reserved path through the network, an arrival time parameter identifying a target arrival time of the isochronous packet into the switched node, and data;
   (b) an asynchronous-to-isochronous converter for converting the asynchronous packets into isochronous packets comprising the data from the asynchronous packets;
   (c) a plurality of bi-directional ports for receiving isochronous packets from other switched nodes and for transmitting isochronous packets to other switched nodes;
   (d) a data buffer for storing the isochronous packets received from the bi-directional ports, the isochronous packets received from the adapter circuitry, and the isochronous packets comprising the asynchronous data;

(e) routing circuitry for selecting at least one of the bi-directional ports to output the stored isochronous packets, and for storing a departure time parameter for each of the stored isochronous packets; and (f) a scheduler, responsive to the target arrival times and the departure times, for scheduling the transmission of the stored isochronous packets through at least one of the bi-directional ports.

2. The switched node as recited in claim 1, wherein the asynchronous-to-isochronous converter comprises a microprocessor for reserving a path through the network for transmitting the isochronous packets comprising the data from the asynchronous packets.

3. The switched node as recited in claim 2, wherein the microprocessor transmits control packets asynchronously through the network to facilitate reserving the path.

4. The switched node as recited in claim 2, wherein the microprocessor schedules the transmission of the isochronous packets comprising the data from the asynchronous packets.

5. The switched node as recited in claim 1, further comprising an isochronous-to-asynchronous converter for converting isochronous packets comprising asynchronous data into asynchronous packets for transmission by the adapter circuitry to the external entity.

6. A multi-dimensional switched fabric network, comprising:
a plurality of interconnected switched nodes, wherein a selected number of the switched nodes each comprise:
adapter circuitry connected to receive asynchronous and isochronous packets from an external entity, wherein:
each asynchronous packet comprises destination node routing information and data; and
each isochronous packet comprises a path ID corresponding to a reserved path through the network, an arrival time parameter identifying a target arrival time of the isochronous packet into the switched node, and data;
an asynchronous-to-isochronous converter for converting the asynchronous packets into isochronous packets comprising the data from the asynchronous packets;
a plurality of bi-directional ports for receiving isochronous packets from other switched nodes and for transmitting isochronous packets to other switched nodes;
a data buffer for storing the isochronous packets received from the bi-directional ports, the isochronous packets received from the adapter circuitry, and the isochronous packets comprising the asynchronous data;
routing circuitry for selecting at least one of the bi-directional ports to output the stored isochronous packets, and for storing a departure time parameter for each of the stored isochronous packets; and
a scheduler, responsive to the target arrival times and the departure times, for scheduling the transmission of the stored isochronous packets through at least one of the bi-directional ports.

7. The multi-dimensional switched fabric network as recited in claim 6, wherein the asynchronous-to-isochronous converter comprises a microprocessor for reserving a path through the network for transmitting the isochronous packets comprising the data from the asynchronous packets.

8. The multi-dimensional switched fabric network as recited in claim 7, wherein the microprocessor transmits control packets asynchronously through the network to facilitate reserving the path.

9. The multi-dimensional switched fabric network as recited in claim 7, wherein the microprocessor schedules the transmission of the isochronous packets comprising the data from the asynchronous packets.

10. The multi-dimensional switched fabric network as recited in claim 6, wherein each of the selected number of nodes further comprise an isochronous-to-asynchronous converter for converting isochronous packets comprising asynchronous data into asynchronous packets for transmission by the adapter circuitry to an external entity.

11. A multi-dimensional switched fabric network, comprising:
(a) a plurality of interconnected switched nodes;
(b) an input for receiving asynchronous and isochronous packets from host initiators, wherein:
each asynchronous packet comprises destination node routing information and data; and
each isochronous packet comprises a path ID corresponding to a reserved path through the network, an arrival time parameter identifying a target arrival time of the isochronous packet into each switched node, and data;
(c) a central microprocessor for converting the received asynchronous packets into isochronous packets comprising the data from the asynchronous packets;
wherein each switched node comprises:
a plurality of bi-directional ports for transmitting the received isochronous packets and the isochronous packets comprising the data from the asynchronous packets through the network;
a data buffer for storing the received isochronous packets and the isochronous packets comprising the asynchronous data;
routing circuitry for selecting at least one of the bi-directional ports to output the stored isochronous packets, and for storing a departure time parameter for each of the stored isochronous packets; and
a scheduler, responsive to the target arrival times and the departure times, for scheduling the transmission of the stored isochronous packets through at least one of the bi-directional ports.

12. The multi-dimensional switched fabric network as recited in claim 11, wherein the central microprocessor reserves a path through the network for transmitting the isochronous packets comprising the data from the asynchronous packets.

13. The multi-dimensional switched fabric network as recited in claim 12, wherein the central microprocessor transmits control packets asynchronously through the network to facilitate reserving the path.

14. The multi-dimensional switched fabric network as recited in claim 12, wherein the central microprocessor schedules the transmission of the isochronous packets comprising the data from the asynchronous packets.

15. The multi-dimensional switched fabric network as recited in claim 11, wherein the central microprocessor converts isochronous packets comprising asynchronous data received from the switched nodes into asynchronous packets transmitted to the host initiators.

16. A method of transmitting asynchronous and isochronous packets through a multi-dimensional switched fabric network comprising a plurality of switched nodes, the method comprising the steps of:
(a) injecting an asynchronous packet into the switched fabric network, the asynchronous packet comprising destination routing information;

(b) injecting an isochronous packet into the switched fabric network, the isochronous packet comprising a path ID corresponding to a reserved path through the network, and a target arrival time parameter identifying a target arrival time of the isochronous packet into a selected one of the switched nodes;

(c) converting the asynchronous packet into an isochronous packet comprising the data from the asynchronous packet;

(d) storing the injected isochronous packet and the isochronous packet comprising the data from the asynchronous packet in a data buffer within the switched nodes;

(e) storing departure time and routing information within each switched storage node corresponding to the injected isochronous packet and the isochronous packet comprising the data from the asynchronous packet; and (f) scheduling the transmission of the stored isochronous packets through the switched nodes based on the target arrival times and the departure times.

17. The method of transmitting asynchronous and isochronous packets through a multi-dimensional switched fabric network as recited in claim 16, further comprising the step of reserving a path through the switched fabric network for the isochronous packet comprising the data from the asynchronous packet.

18. The method of transmitting asynchronous and isochronous packets through a multi-dimensional switched fabric network as recited in claim 17, wherein the step of reserving a path comprises the step of transmitting control packets asynchronously through the multi-dimensional switched fabric network.

19. The method of transmitting asynchronous and isochronous packets through a multi-dimensional switched fabric network as recited in claim 16, further comprising the step of converting the isochronous packet comprising the data from the asynchronous packet into an asynchronous packet.

* * * * *